Patented July 5, 1938

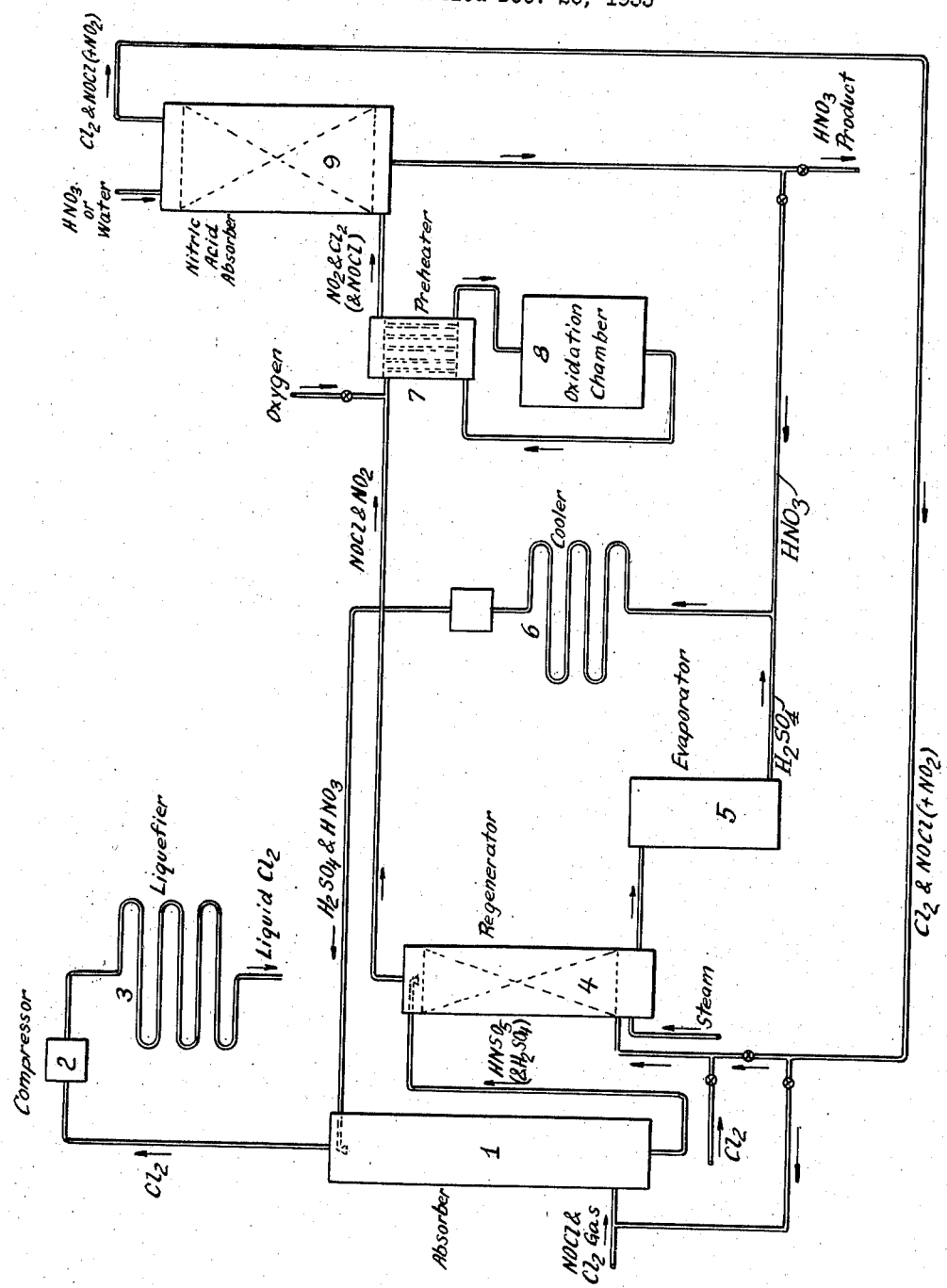

2,123,072

UNITED STATES PATENT OFFICE 2,123,072

PROCESS FOR THE TREATMENT OF GASES

Herman A. Beekhuis, Jr., Petersburg, Va., assignor, by mesne assignments, to The Solvay Process Company, New York, N. Y., a corporation of New York Application December 26, 1933, Serial No. 703,883

14 Claims. (Cl. 23—157)

This invention relates to a process for the treatment of gaseous mixtures containing nitrosyl chloride. More particularly this invention relates to a process for the treatment of mixtures of nitrosyl chloride and chlorine to absorb the nitrosyl chloride in sulfuric acid containing nitric acid or in the presence of oxides of nitrogen, whereby the chlorine is obtained as a relatively pure chlorine gas.

It is an object of this invention to provide a method for the treatment of gases containing nitrosyl chloride, particularly such gases as also contain chlorine, to convert the mixture into utilizable products, particularly chlorine and nitric acid. It is a further object of this invention to provide a process whereby substantially all of the chlorine in such a gaseous mixture, both free chlorine and that combined as nitrosyl chloride, may be recovered as a substantially pure chlorine product and the nitrogen content of the gas, both the nitrogen combined as nitrosyl chloride and that combined in the form of nitric acid or nitrogen oxides, may be substantially completely recovered as nitric acid.

In treating a gas containing nitrosyl chloride in accordance with this invention, the gas is passed in contact with a mixture of sulfuric and nitric acids to absorb the nitrosyl chloride and any nitrogen oxides which may be present in the gas. Chlorine contained in the gas is substantially unabsorbed. The chemical reaction upon which this absorption of the nitrosyl chloride is based may be expressed by the equation I. $2NOCl + HNO_3 + 3H_2SO_4 = 3HNSO_5 + Cl_2 + 2H_2O$.

In reacting with the mixture of nitric and sulfuric acids, the nitrosyl chloride is decomposed to yield free chlorine gas which passes on out of contact with the acid together with any free chlorine originally present in the gas treated with the acids. The solution of nitrosyl sulfuric acid is then treated with a halogen material such as chlorine gas, hydrogen chloride, or a chloride such as sodium or potassium chloride, to form sulfuric acid from the nitrosyl sulfuric acid, nitrosyl chloride being evolved in this treatment of the nitrosyl sulfuric acid. Instead of chlorine or chlorides, the other halogens or halides (including the hydrogen halides) such as bromine or iodine or bromides or iodides may be employed for treating the nitrosyl sulfuric acid. The reaction here taking place may be expressed by the equations:

II. $2HNSO_5 + \tfrac{1}{2}Cl_2 + H_2O = NOCl + NO_2 + 2H_2SO_4$

III. $HNSO_5 + HCl = NOCl + H_2SO_4$

When a chloride such as NaCl is employed, the sulfuric acid present reacts with the chloride to form hydrogen chloride which then reacts with the nitrosyl sulfuric acid as described above. It is preferred, however, to employ either free chlorine or hydrogen chloride rather than a chloride salt or another halogen or halogen compound. Accordingly, the invention will be hereafter described in connection with the use of chlorine or hydrogen chloride, but it is to be understood that by using bromine or iodine or compounds of these halogens analogous reactions take place and compositions analogous to those containing chlorine are formed. It is advantageous to heat the nitrosyl sulfuric acid to decompose it. This heating may preferably be carried out by introducing steam into direct contact with the acid whereby the acid is not only heated but is simultaneously diluted by condensation of steam. The dilution of the acid solution also aids in the reformation of the sulfuric acid. The process of this invention, therefore, when employed for the treatment of a gas containing nitrosyl chloride and chlorine, comprises the steps of removing the nitrosyl chloride from the chlorine, and separately recovering nitrosyl chloride. This recovered nitrosyl chloride may be oxidized to nitrogen peroxide and chlorine and the nitrogen peroxide recovered separate from the chlorine in the reaction products obtained in oxidizing the nitrosyl chloride.

The regenerated sulfuric acid may be evaporated to boil off the water absorbed from the nitrosyl chloride gas and that condensed from the steam in heating the nitrosyl sulfuric acid. The concentrated acid may then be mixed with nitric acid and returned for treatment of additional nitrosyl chloride gas.

The nitrosyl chloride or the mixture of nitrosyl chloride and nitrogen peroxide obtained by the decomposition of the nitrosyl sulfuric acid, depending upon whether hydrogen chloride or free chlorine is employed in treating nitrosyl sulfuric acid, may be oxidized by heating it with oxygen to form nitrogen peroxide and chlorine from the nitrosyl chloride. This gas containing chlorine and residual unoxidized nitrosyl chloride may then be passed in contact with water or aqueous nitric acid to absorb nitrogen peroxide with the formation of nitric acid. A portion of this nitric acid may be employed for addition to the sulfuric acid used in scrubbing the nitrosyl chloride gas and the remaining acid may be withdrawn from the process as the product. The nitrosyl chloride and chlorine gas which may be recovered from the nitric acid formed by absorption of the nitrogen peroxide, may be employed for the treatment of the nitrosyl sulfuric acid and thus returned to the cycle in which the nitrosyl chloride is oxidized and nitrogen peroxide absorbed to form nitric acid.

The invention further comprises improvements in individual steps of the general process described above, particularly in the method of absorbing nitrosyl chloride in a mixture of sulfuric and nitric acid and regeneration of the resulting nitrosyl sulfuric acid, which improvements will be more specifically described hereinafter.

For a further understanding of the nature and objects of the invention, reference should be had to the following detailed description taken in connection with the accompanying drawing in which is illustrated one process for the treatment of a gas containing nitrosyl chloride and chlorine in accordance with the process of this invention.

Referring to the drawing, the numeral 1 indicates an absorber which may consist of a tower containing bubbling plates or a packing material, into the bottom of which the nitrosyl chloride-chlorine gas is introduced and into the top of which there is introduced a mixture of sulfuric acid and nitric acid at a temperature below about 50° C., preferably at about 30° C. This solution of mixed acids is preferably a concentrated sulfuric acid containing about 70% $H_2SO_4$, 10% $HNO_3$ and 20% $H_2O$. The solution is supplied in such amount that it contains 1 mol. or more of nitric acid for every 2 mols of nitrosyl chloride to be removed from the gas; i. e., the stoichiometric proportion or more of nitric acid to nitrosyl chloride is employed. In absorber 1 the nitrosyl chloride and chlorine gas passes upwardly in contact with the descending flow of sulfuric and nitric acids and the nitrosyl chloride reacts with the acids to form nitrosyl sulfuric acid and chlorine. The gas should be brought into intimate and thorough contact with the mixture of sulfuric acid and nitric acid in the absorber in order that the chlorine gas leaving the absorber may be substantially free of hydrochloric acid gas which may be formed by reaction of nitrosyl chloride with sulfuric acid. The chlorine evolved as the result of this reaction, together with that present in the gas introduced into absorber 1, is withdrawn from the top of the absorber, compressed in a compressor 2 and cooled in a liquefier 3 to condense it as liquid chlorine which is withdrawn as one of the products of this process.

The nitrosyl sulfuric acid formed in absorber 1 is withdrawn from the bottom of the absorber and introduced into the top of a regenerator 4. This regenerator is a tower containing a packing, bubble plates or other means for insuring intimate contact between the nitrosyl sulfuric acid descending through the tower, and steam and chlorine which are introduced into the bottom of the tower. Chlorine gas is introduced into the regenerator in the proportions of about 1 or more mols of chlorine for every 4 mols of nitrosyl sulfuric acid. The steam is introduced into the regenerator in amounts sufficient to heat the liquor in the regenerator to a temperature of about 50° C. to 100° C. and preferably to about 75° C. to 100° C., and to condense sufficient water in the acid so that the acid leaving the bottom of the regenerator contains sulfuric acid and water in the proportions corresponding to an aqueous sulfuric acid solution containing about 60% to 70% $H_2SO_4$. If desired, liquid water may be introduced into the nitrosyl sulfuric acid on its way to or in the regenerator to aid in the dilution of the acid. The sulfuric acid withdrawn from the bottom of regenerator 4 is concentrated in an evaporator 5 and is then mixed with nitric acid. The concentrating of the sulfuric acid in the evaporator is carried to such an extent that after the addition of nitric acid the mixture of acids contains about 70 parts of $H_2SO_4$ for every 20 parts of water together with 10 parts of nitric acid. This corresponds to the acid liquor originally introduced into the absorber. This concentrated mixed acid is returned to the top of absorber 1 after being cooled preferably to a temperature of about 30° C. This cooling may be accomplished in a cooler 6.

When materially more chlorine than 1 mol. of chlorine to every 4 mols of nitrosyl sulfuric acid is employed in the regenerator, some nitric acid is formed in decomposing the nitrosyl sulfuric acid. The amount of nitric acid added to the sulfuric acid before concentration, as described above, will be so proportioned that the mixed acid solution when returned for treatment of the nitrosyl chloride-chlorine gas contains the desired proportion of nitric acid. The use of a larger amount of chlorine than that corresponding to the above proportion of chlorine to nitrosyl chloride, is at times also advantageous since it permits of converting the nitrosyl sulfuric acid into sulfuric acid without heating or diluting it. Thus, the nitrosyl sulfuric acid from absorber 1, without introducing into it steam or water, may be treated with excess chlorine in regenerator 4 and decomposed into sulfuric acid. If desired, the nitrosyl sulfuric acid may be heated prior to or during this regeneration treatment, although with the nitrosyl sulfuric acid leaving the absorber at a temperature of 25° C. or above, it may be treated with the chlorine without further heating. When the nitrosyl sulfuric acid is not diluted when treated in regenerator 4, the amount of water which is evaporated in evaporator 5 may be limited to that corresponding to the amount absorbed from the gases in absorber 1 and in regenerator 4.

The gaseous nitrosyl chloride and nitrogen peroxide evolved from the nitrosyl sulfuric acid in regenerator 4 is mixed with oxygen sufficient in amount to oxidize the nitrosyl chloride to nitrogen peroxide and chlorine. The gas is then passed through a preheater 7 and an oxidation chamber 8. In preheater 7 the gases are heated to a temperature of about 200° C. and are then passed in oxidation chamber 8 in contact with a catalyst promoting the reaction of the oxygen and nitrosyl chloride. The hot products of the reaction are passed through preheater 7 in heat exchange relationship with the gases on their way to the oxidation chamber and serve to preheat these gases to the desired elevated temperature. The reaction between the nitrosyl chloride and oxygen is exothermic. Accordingly, when operating in the above described manner, the reaction may be made thermally self-sustaining, so that no heat is required from an external source in order to maintain the gases in the oxidation chamber at the desired elevated temperature. It may be advisable in certain instances to provide means for cooling the gases in oxidation chamber 8 in order to prevent them from attaining an undesirably high temperature during their passage through this oxidation chamber.

The nitrogen peroxide and chlorine gas containing residual unoxidized nitrosyl chloride is passed from preheater 7 into the bottom of absorber 9, in which the gases are passed upwardly in contact with a descending flow of an aqueous liquor such as water or nitric acid containing about 60% to 90% HNO₃ and preferably about 70% HNO₃. This water or nitric acid is introduced into absorber 9 at a temperature between about 20° C. and 40° C., for example, at about 30° C., and absorbs the nitrogen dioxide to form nitric acid. The presence of the chlorine in the gas passing through absorber 9 facilitates the reaction of the nitrogen peroxide with the water or nitric acid with the formation of nitrosyl chloride. As the nitric acid descends through absorber 9, its temperature is gradually increased until at the bottom of the tower it is above 50° C. and is preferably at a temperature of about 60° C. The absorber may be provided with a heater when the heat in the incoming gases is insufficient to maintain the desired temperatures in the absorber. At these higher temperatures the nitrosyl chloride and nitrogen oxides which are dissolved in the nitric acid at relatively low temperatures are at least in part evolved from the solution. The residual nitrosyl chloride and chlorine content of the nitric acid withdrawn from absorber 9 may, if desired, be removed by further heating this nitric acid and passing it in contact with an oxygen gas. The gas containing nitrosyl chloride and chlorine leaving the top of absorber 9 is introduced into the bottom of regenerator 4 and may thus be returned for oxidation of the nitrosyl chloride and reuse of the chlorine content of this gas in the regeneration of the nitrosyl sulphuric acid. In order to prevent the accumulation to an undesirable degree of inert gases in the gases recycled from the absorber to the regenerator, a portion of this gas may be continuously withdrawn and introduced into absorber 1 for recovery of its chlorine and nitrosyl chloride content, the inert gas being vented from liquefier 3. The required amount of chlorine to replace that thus withdrawn from the recycled gas may be introduced into the gas returned to the regenerator.

While the process above described is of particular importance for the treatment of a gas containing a relatively small proportion of nitrosyl chloride, it may, if desired, be employed for the treatment of gases containing this material in any proportions.

As a further example of a process for carrying out the present invention, the following description is given of a method for treating a mixture of nitrosyl chloride and chlorine which is formed in carrying out the reaction of nitric acid and a chloride such as sodium, potassium or calcium chloride, to form the corresponding nitrate. The gaseous mixture containing about equal proportions by volume of nitrosyl chloride and chlorine obtained from such a process, is passed countercurrent to about 80% nitric acid at a temperature of about 75° C. The nitric acid acts to oxidize a portion of the nitrosyl chloride to nitrogen peroxide. A gaseous mixture containing, for example, about 56 volumes of chlorine, 38 volumes of nitrosyl chloride and 38 volumes of nitrogen peroxide may thus be obtained. This gaseous mixture is then scrubbed with a countercurrent flow of about 80% sulphuric acid solution at a temperature of about 25° C. The rate of flow of the sulfuric acid is so regulated that the liquor leaving the tower in which the gas and sulfuric acid are contacted contains about 3% of nitrogen as nitrosyl sulfuric acid. A substantially pure chlorine leaves the top of this tower and may be treated to liquefy the chlorine.

The nitrosyl sulfuric acid is then heated and diluted by passing steam into the acid while hydrogen chloride gas is passed in contact with the heated acid. The steam is employed in sufficient amount to dilute the acid to about 60% to 70% H₂SO₄. Nitrosyl chloride is evolved in this treatment of the nitrosyl sulfuric acid, with the formation of sulfuric acid which may be concentrated to about 80% H₂SO₄ and re-used for the absorption of nitrosyl chloride. The nitrosyl chloride evolved may be absorbed in water to form a mixture of hydrochloric and nitric acids and nitric oxide. The nitric oxide may be oxidized and absorbed in water to form nitric acid while the mixture of nitric and hydrochloric acids may be heated and concentrated to form nitrosyl chloride and chlorine which may be mixed with the original nitrosyl chloride and chlorine gas which is treated as described above with nitric acid.

The use in this process of a sulfuric-nitric acid solution containing but a small amount of water for the absorption of the nitrosyl chloride is advantageous in connection with the treatment of gases containing water vapor. The absorption liquid acts to dry these gases so that without a special drying treatment they may be directly compressed and cooled to liquefy the chlorine and obtain a substantially anhydrous liquid chloride product.

Numerous changes may be made in the process described above without departing from the scope of this invention, and accordingly the particular processes described are to be considered is illustrative rather than as limiting the invention. For example, the gas containing nitrogen peroxide, chlorine and nitrosyl chloride from the oxidation of the nitrosyl chloride may be cooled to liquefy a mixture of the three materials. This liquid mixture may then be fractionally distilled to separately recover the nitrogen peroxide from the chlorine and nitrosyl chloride, thus obtaining either a liquid nitrogen peroxide or a concentrated nitrogen peroxide gas as one of the products of this process, while the mixture of chlorine and nitrosyl chloride separated from the nitrogen peroxide may be returned to the denitration treatment of the nitrosyl sulfuric acid. In this case nitric acid from an outside source may be employed for admixture with the sulfuric acid used in the absorber and the nitrogen content of this nitric acid introduced into the process is eventually recovered as a liquid or concentrated gaseous nitrogen peroxide.

Again, while in the process particularly described the gas from absorber 9 is returned directly to regenerator 4, this gas may be passed from the absorber in contact with moist solid sodium, potassium, or calcium chloride to form the corresponding nitrate by reaction of the residual nitrogen peroxide contained in the gas with the chloride. The gas after contact with the moist chloride may then be passed to regenerator 4. If desired, an excess of solid chloride may be used for treating the gas from the absorber and the resulting mixture of chloride and nitrate be employed for the production of a nitrate by reaction of nitric acid and a chloride, for example, in the manner described in my copending application, Serial No. 684,829, filed August 12, 1933.

The process shown in the drawing may also be modified by substituting for the treatment with nitric acid of the gas leaving preheater 7, a treatment of this gas by contacting it with a moist solid chloride. In so operating the gas from preheater 7 may be passed into a vessel containing, for example, moist solid sodium chloride. The moist sodium chloride absorbs nitrogen peroxide and reacts to form sodium nitrate. The unabsorbed gas together with gaseous products of the reaction between the sodium chloride and nitrogen peroxide may be passed from this vessel to regenerator 4, for treatment of nitrosyl sulfuric acid therein. In this case nitric acid from an outside source is supplied to the sulfuric acid leaving regenerator 4.

If desired, the gas from absorber 9 or that from preheater 7 may be passed directly into contact with a mixture of chloride and nitric acid being treated for the production of nitrate. In thus operating, the nitrogen peroxide in the gas acts upon the chloride to form nitrate and the unabsorbed gases facilitate the reaction of the chloride and nitrate by serving to strip the gaseous products of the reaction from the reaction mixture.

Instead of employing a mixture of sulfuric acid and nitric acid for the treatment of the nitrosyl chloride gas in absorber 1, an oxide of nitrogen such as nitrogen peroxide may be introduced into this absorber together with the nitrosyl chloride gas. The nitrogen peroxide should be present in amount at least sufficient for reaction with the nitrosyl chloride in accordance with the equation:

IV.    $NOCl + NO_2 + 2H_2SO_4 = 2HNSO_5 + \tfrac{1}{2}Cl_2 + H_2O$

Preferably the nitrogen peroxide should be employed in slight excess over the amount indicated by the above equation. Thus, the stoichiometric proportion or more of nitric acid to nitrosyl chloride is employed. Since nitrogen dioxide with water forms nitric acid, it would appear possible that nitric acid is an intermediate product formed from the water and nitrogen peroxide and that this nitric acid then reacts with the nitrosyl chloride and sulfuric acid to form nitrosyl sulfuric acid and chlorine in accordance with Equation I above. Whether this is or is not in fact the course of the reaction, both nitric acid and nitrogen peroxide have been found to act with sulfuric acid to absorb nitrosyl chloride from a gas with the evolution of chlorine.

I claim:

1. The process for the separation of nitrosyl chloride from a gas containing the same which comprises passing concentrated sulfuric acid in contact with said gas in the presence of a material from the group nitric acid and nitrogen peroxide at a temperature at which the nitrosyl chloride reacts with the sulfuric acid and said nitric acid and nitrogen peroxide to form nitrosyl sulfuric acid, withdrawing the resulting nitrosyl sulfuric acid from contact with said gas, and then heating the nitrosyl sulfuric acid and introducing a material from the group consisting of the halogens and halides to decompose the nitrosyl sulfuric acid forming a nitrosyl halide.

2. The process for the separation of nitrosyl chloride from a mixture of the same with chlorine which comprises passing a mixture of concentrated sulfuric acid and nitric acid in contact with said mixture of nitrosyl chloride and chlorine at a temperature at which the nitrosyl chloride reacts with said mixture of sulfuric and nitric acids to form nitrosyl sulfuric acid, withdrawing the resulting nitrosyl sulfuric acid from contact with said mixture of nitrosyl chloride and chlorine, and then heating the nitrosyl sulfuric acid and introducing into contact therewith a material from the group chlorine and hydrogen chloride to decompose the nitrosyl sulfuric acid forming nitrosyl chloride.

3. The process for the separation of nitrosyl chloride from a gas containing the same which comprises passing concentrated sulfuric acid at a temperature below about 50° C. in contact with said gas in the presence of a material from the group nitric acid and nitrogen peroxide thereby reacting the nitrosyl chloride with the sulfuric acid and said nitric acid and nitrogen peroxide to form nitrosyl sulfuric acid, withdrawing the resulting nitrosyl sulfuric acid from contact with said gas, and then heating the nitrosyl sulfuric acid to above about 50° C. and introducing chlorine in contact with the heated acid to decompose the nitrosyl sulfuric acid forming nitrosyl chloride.

4. The process for the separation of nitrosyl chloride from a mixture of the same with chlorine and the production of nitric acid which comprises passing a mixture of concentrated sulfuric acid and nitric acid in contact with said mixture of nitrosyl chloride and chlorine at a temperature at which the nitrosyl chloride reacts with said mixture of sulfuric and nitric acids to form nitrosyl sulfuric acid, withdrawing the resulting nitrosyl sulfuric acid from contact with said mixture of nitrosyl chloride and chlorine, then heating the resulting nitrosyl sulfuric acid and passing in contact therewith a gas containing chlorine to decompose the nitrosyl sulfuric acid forming nitrosyl chloride, oxidizing the nitrosyl chloride thus obtained to form nitrogen peroxide and chlorine, passing the resulting mixture of nitrogen peroxide and chlorine in contact with an aqueous liquor to absorb nitrogen peroxide and to form nitric acid, and returning the unabsorbed gases containing chlorine and nitrosyl chloride into contact with said nitrosyl sulfuric acid at an elevated temperature.

5. The process for the separation of nitrosyl chloride from a mixture of the same with chlorine and the production of nitric acid which comprises passing a mixture of sulfuric acid and nitric acid containing about 70% $H_2SO_4$, 10% $HNO_3$ and 20% $H_2O$ in contact with said mixture of nitrosyl chloride and chlorine at a temperature below about 50° C. to form nitrosyl sulfuric acid by reaction of the sulfuric and nitric acids with said mixture of nitrosyl chloride and chlorine, withdrawing the resulting nitrosyl sulfuric acid from contact with said mixture of nitrosyl chloride and chlorine, then heating said nitrosyl sulfuric acid to about 75° C. to 100° C. and diluting the acid with water, passing in contact with the heated and diluted acid a gas containing chlorine in the proportions of at least about one mol. of chlorine to every 4 mols of nitrosyl sulfuric acid to decompose the nitrosyl sulfuric acid forming nitrosyl chloride, oxidizing said last mentioned nitrosyl chloride to form nitrogen peroxide and chlorine, passing the resulting mixture of nitrogen peroxide and chlorine in contact with nitric acid to absorb nitrogen peroxide with the formation of nitric acid, and returning the unabsorbed gases containing chlorine and nitrosyl chloride into contact with said nitrosyl sulfuric acid at an elevated temperature.

6. The process for the denitration of nitrosyl sulfuric acid and the production of nitric acid which comprises introducing chlorine into contact with said nitrosyl sulfuric acid at a temperature at which said chlorine reacts with the nitrosyl sulfuric acid to form nitrosyl chloride and nitrogen peroxide, oxidizing the nitrosyl chloride thus formed to nitrogen peroxide and chlorine, passing the resulting mixture of nitrogen peroxide and chlorine in contact with an aqueous liquor to absorb nitrogen peroxide and to form nitric acid, and returning the unabsorbed gases containing chlorine and nitrosyl chloride into contact with said nitrosyl sulfuric acid.

7. The process for the denitration of nitrosyl sulfuric acid and the production of nitric acid which comprises introducing chlorine into contact with said nitrosyl sulfuric acid at an elevated temperature at which said chlorine reacts with the nitrosyl sulfuric acid to form nitrosyl chloride and nitrogen peroxide, separating the resulting mixture of nitrogen peroxide and chlorine gases from the nitrosyl sulfuric acid, oxidizing the nitrosyl chloride thus formed to nitrogen peroxide and chlorine, and passing the resulting gases in contact with an aqueous liquor to absorb nitrogen peroxide and to form nitric acid, passing the unabsorbed gases containing chlorine, nitrosyl chloride and nitrogen peroxide in contact with moist solid chloride to absorb the nitrogen peroxide and form a nitrate, and returning residual gases into contact with said nitrosyl sulfuric acid at an elevated temperature.

8. The process for the separation of nitrosyl chloride from a mixture of the same with chlorine and the production of a concentrated nitric acid which comprises passing a mixture of concentrated sulfuric acid and nitric acid in contact with said mixture of nitrosyl chloride and chlorine at a temperature at which the nitrosyl chloride and sulfuric and nitric acids react to form chlorine and nitrosyl sulfuric acid, withdrawing the nitrosyl sulfuric acid thus formed from contact with said mixture of nitrosyl chloride and chlorine, then heating the nitrosyl sulfuric acid and passing in contact therewith a gas containing chlorine at a temperature at which the nitrosyl sulfuric acid and chlorine react to form nitrosyl chloride and nitrogen peroxide and sulfuric acid is obtained, oxidizing the last mentioned nitrosyl chloride to nitrogen peroxide and chlorine, passing the resulting mixture of nitrogen peroxide and chlorine in contact with an aqueous nitric acid containing about 60–90% $HNO_3$ to absorb the nitrogen peroxide and to form concentrated nitric acid, mixing concentrated nitric acid thus obtained with the aforesaid sulfuric acid and employing the mixture of acids thus obtained for the treatment of said mixture of said nitrosyl chloride and chlorine.

9. The process for the separation of nitrosyl chloride from a mixture of the same with chlorine and the production of nitric acid which comprises passing a mixture of concentrated sulfuric acid and nitric acid in contact with said mixture of nitrosyl chloride and chlorine at a temperature at which the nitrosyl chloride reacts with said mixture of sulfuric and nitric acids to form nitrosyl sulfuric acid, withdrawing the resulting nitrosyl sulfuric acid from contact with said mixture of nitrosyl chloride and chlorine, then heating the nitrosyl sulfuric acid and introducing into contact with the heated acid a material from the group consisting of chlorine and chlorides to decompose the nitrosyl sulfuric acid forming nitrosyl chloride, oxidizing the nitrosyl chloride thus obtained to form nitrogen peroxide and chlorine, passing the resulting mixture of nitrogen peroxide and chlorine in contact with an aqueous liquor to absorb nitrogen peroxide and to form a concentrated nitric acid and evolve gaseous nitrosyl chloride which, together with a portion of the chlorine passed into contact with said aqueous liquor and not taking part in the reaction forming nitrosyl chloride, is withdrawn from contact with said aqueous liquor, introducing nitrosyl chloride formed in treating said aqueous liquor with the mixture of nitrogen peroxide and chlorine into additional quantities of the first mentioned mixture of nitrosyl chloride and chlorine and treating the resulting mixture with concentrated sulfuric acid and nitric acid in the manner set forth herein.

10. The process for the separation of nitrosyl chloride from a gas containing the same which comprises passing said gas in contact with concentrated sulfuric acid and a material from the group nitric acid and nitrogen peroxide at a temperature at which the nitrosyl chloride reacts with the sulfuric acid and said nitric acid and oxides of nitrogen to form nitrosyl sulfuric acid, said gas being contacted with at least the stoichiometric proportion of said material from the group nitric acid and oxides of nitrogen to the nitrosyl chloride in the gas, withdrawing the resulting nitrosyl sulfuric acid from contact with said gas, and then treating the nitrosyl sulfuric acid with a material from the group consisting of the halogens and halides under conditions with respect to temperature and amount of the halogen or halide with which the nitrosyl sulfuric acid is treated which result in the decomposition of the nitrosyl sulfuric acid to form a nitrosyl halide and sulfuric acid.

11. The process for the separation of nitrosyl chloride from a gas containing the same which comprises passing said gas in contact with concentrated sulfuric acid and a material from the group nitric acid and nitrogen peroxide at a temperature at which the nitrosyl chloride reacts with the sulfuric acid and said nitric acid and oxides of nitrogen to form nitrosyl sulfuric acid, said gas being contacted with at least stoichiometric proportions of said material from the group nitric acid and oxides of nitrogen to the nitrosyl chloride in the gas, withdrawing the resulting nitrosyl sulfuric acid from contact with said gas, and then heating the nitrosyl sulfuric acid and treating the heated acid with a material from the group consisting of the halogens and halides to decompose the nitrosyl sulfuric acid forming a nitrosyl halide.

12. The process for the separation of nitrosyl chloride from a gas containing the same together with chloride and the production of nitric acid which comprises passing said gas in contact with concentrated sulfuric acid in the presence of a material from the group consisting of nitric acid and nitrogen peroxide at a temperature at which the nitrosyl chloride reacts with said sulfuric acid and nitric acid or nitrogen peroxide to form nitrosyl sulfuric acid, withdrawing the resulting nitrosyl sulfuric acid from contact with said gas, then heating the resulting nitrosyl sulfuric acid and passing in contact therewith a gas containing chlorine to decompose the nitrosyl sulfuric acid forming nitrosyl chloride, oxidizing the nitrosyl chloride thus obtained to form nitrogen peroxide and chlorine, passing the resulting mixture of nitrogen peroxide and chlorine in contact with an aqueous liquor to absorb nitrogen peroxide and to form nitric acid, and returning the unabsorbed gases containing chlorine and nitrosyl chloride into contact with said nitrosyl sulfuric acid at an elevated temperature.

13. The process for the separation of nitrosyl chloride from a gas containing the same together with chlorine and the production of nitric acid which comprises passing said gas in contact with concentrated sulfuric acid in the presence of a material from the group consisting of nitric acid and nitrogen peroxide at a temperature at which the nitrosyl chloride reacts with said sulfuric and nitric acid or nitrogen peroxide to form nitrosyl sulfuric acid, withdrawing the resulting nitrosyl sulfuric acid from contact with said mixture of nitrosyl chloride and chlorine, then heating the nitrosyl sulfuric acid and introducing into contact with the heated acid a material from the group consisting of chlorine and chlorides to decompose the nitrosyl sulfuric acid forming nitrosyl chloride, oxidizing the nitrosyl chloride thus obtained to form nitrogen peroxide and chlorine, passing the resulting mixture of nitrogen peroxide and chlorine in contact with an aqueous liquor to absorb nitrogen peroxide and to form a concentrated nitric acid and evolve gaseous nitrosyl chloride which, together with a portion of the chlorine passed into contact with said aqueous liquor and not taking part in the reaction forming nitrosyl chloride, is withdrawn from contact with said aqueous liquor, introducing nitrosyl chloride formed in treating said aqueous liquor with the mixture of nitrogen peroxide and chlorine into additional quantities of the first mentioned mixture of nitrosyl chloride and chlorine and treating the resulting mixture with concentrated sulfuric acid and nitric acid in the manner set forth herein.

14. The process for the separation of nitrosyl chloride from a gas containing the same together with chlorine and the production of nitric acid which comprises passing said gas in contact with concentrated sulfuric acid in the presence of a material from the group consisting of nitric acid and nitrogen peroxide at a temperature at which the nitrosyl chloride reacts with said sulfuric acid and nitric acid or nitrogen peroxide to form nitrosyl sulfuric acid, withdrawing the resulting nitrosyl sulfuric acid from contact with said gas, then introducing chlorine into contact with said nitrosyl sulfuric acid at an elevated temperature at which said chlorine reacts with the nitrosyl sulfuric acid to form nitrosyl chloride and nitrogen peroxide, separating the resulting mixture of nitrogen peroxide and chlorine gases from the nitrosyl sulfuric acid, oxidizing the nitrosyl chloride thus formed to nitrogen peroxide and chlorine, and passing the resulting gases in contact with an aqueous liquor to absorb nitrogen peroxide and to form nitric acid, passing the unabsorbed gases containing chlorine, nitrosyl chloride and nitrogen peroxide in contact with moist solid chloride to absorb the nitrogen peroxide and form a nitrate, and returning residual gases and introducing them into the first mentioned gas which is passed in contact with said sulfuric acid in the presence of said material from the group consisting of nitric acid and nitrogen peroxide.

HERMAN A. BEEKHUIS, Jr.

CERTIFICATE OF CORRECTION.

Patent No. 2,123,072.  July 5, 1938.

HERMAN A. BEEKHUIS, JR.

It is hereby certified that error appears in the printed specification of the above numbered patent requiring correction as follows: Page 2, first column, line 10, for the word "regeneration" read denitration; page 4, first column, line 62, claim 1, after the syllable "ducing" insert the words into contact with the heated acid; page 5, second column, line 55, claim 12, for "chloride" read chlorine; and that the said Letters Patent should be read with this correction therein that the same may conform to the record of the case in the Patent Office.

Signed and sealed this 30th day of August, A. D. 1938.

Henry Van Arsdale (Seal)  Acting Commissioner of Patents.